United States Patent [19]

Kihara et al.

[11] Patent Number: 5,670,612
[45] Date of Patent: Sep. 23, 1997

[54] POLYAMINE/EPOXY-CONTAINING POLYOXYETHYLENE/HYDROPHOBIC EPOXY ADDUCT CURING AGENT

[75] Inventors: Shuta Kihara; Shinichi Yonehama; Kiichiro Seki, all of Hiratsuka, Japan

[73] Assignee: Mitsubishi Gas Chemical Company, Inc., Tokyo, Japan

[21] Appl. No.: 541,500

[22] Filed: Oct. 10, 1995

[30] Foreign Application Priority Data

Oct. 28, 1994 [JP] Japan ..................... 6-265171

[51] Int. Cl.$^6$ ..................... C08G 59/14; C08G 65/26
[52] U.S. Cl. ..................... 528/419; 523/409; 523/411; 523/412; 523/414; 523/420; 524/608; 524/612
[58] Field of Search ..................... 523/414, 420; 524/608, 612; 528/419

[56] References Cited

U.S. PATENT DOCUMENTS

| | | | |
|---|---|---|---|
| 4,197,389 | 4/1980 | Becker et al. | 525/507 |
| 4,215,032 | 7/1980 | Kobayashi et al. | 524/539 |
| 4,493,913 | 1/1985 | Hirobe et al. | 523/205 |
| 5,246,984 | 9/1993 | Darwen et al. | 523/404 |
| 5,508,324 | 4/1996 | Cook | 523/404 |

FOREIGN PATENT DOCUMENTS

| | | |
|---|---|---|
| 0 000 605 | 2/1979 | European Pat. Off. . |
| WO 91/10695 | 7/1991 | WIPO . |

OTHER PUBLICATIONS

Patent Abstracts Of Japan, vol. 18. No. 520, (C-1255), 30 Sep. 1994 of JP-A-06 179801 (Asashi Denka Kogya KK), 28 Jun. 1994.

Derwent Abstract of JP-6-179801, Jun. 28, 1994.

Chemical Abstracts, Abstract of JP-6-179801, Jun. 28, 1994.

Chemical Abstracts, vol. 78, No. 18, 7 May 1973, Columbus, Ohio, Abstract No. 112236 of JP-A-47 033 200 (Nisso Kenzai Kogyo Co., Ltd.) 17 Nov. 1972.

Derwent Abstract of JP-47-033200, Nov. 17, 1992.

*Primary Examiner*—Robert E. Sellers
*Attorney, Agent, or Firm*—Frishauf, Holtz, Goodman, Langer & Chick, P.C

[57] ABSTRACT

An aqueous self-emulsifiable epoxy resin curing agent which is produced by reacting, with each other, an (A) polyamine (meta-xylylenediamine, etc), a (B) epoxy group-containing alkoxypolyethylene polyether compound (methoxypolyethyleneglycol glycidyl ether, etc.) having 500 to 5000 average molecular weight, at least one (C) hydrophobic epoxy compound having at least one epoxy group in the molecule (butyl glycidyl ether, epoxy resin of type bisphenol A or F, etc.) and optionally, a (D) unsaturated compound capable of addition reaction (acrylonitrile, methyl methacrylate, etc.), in a molar quantity of the epoxy group in (B) of 0.001 to 0.1 mol and in a molar quantity of the sum of the epoxy group in (C) and the unsaturated group in (D) of 0.2 to 0.5 mol, each based on 1 mol of a hydrogen atom bonded to a nitrogen atom in (A) which is capable of reacting with an epoxy group or a unsaturated group.

6 Claims, No Drawings

POLYAMINE/EPOXY-CONTAINING POLYOXYETHYLENE/HYDROPHOBIC EPOXY ADDUCT CURING AGENT

BACKGROUND OF THE INVENTION

1. Field of the Invention

The present invention relates to an epoxy resin curing agent containing water as the medium. More particularly, it pertains to an epoxy resin curing agent that can be utilized in a wide variety of industrial applications such as a coating material used for the purpose of anticorrosion or decoration, an adhesive for civil and building work or the like.

2. Description of Related Art

An epoxy resin is widely utilized in a variety of industrial fields by virtue of a number of excellent characteristics in comparison with the other types of resins in terms of adhesivity to various substrates, heat resistance, chemical resistance, electrical properties and mechanical properties. In general, the types of the epoxy resin compositions that are employed in the field of coating material or adhesive are roughly classified into liquid type without the use of a solvent (solventless type), liquid type by the use of an organic solvent as the principal medium, liquid type by the use of water as the medium and solid type (powder).

Among the aforementioned types, the solventless type epoxy resin composition is used as the composition in which an epoxy resin in the form of liquid at ordinary temperature is lowered in its viscosity by the use of a low-viscosity curing agent and a high boiling diluent. However, it is inevitable that, in the course of producing a low-viscosity curing agent, a large amount of free amines and phenols that are harmful to human beings have to be used, and even in the case of a diluent that is relatively less harmful to human beings, the use of such diluent deteriorates the performance of a curing agent.

The liquid type epoxy resin composition using an organic solvent as the principal medium is used generally by dissolving a high molecular epoxy resin in the form of solid at ordinary temperature by the use of a low-viscosity solvent such as xylene, toluene, cellosolve, ethanol or n-butanol and permits a wide selective range of curing agents. Accordingly, the above-mentioned composition not only affords a high-performance cured product but also permits the arbitrary regulation of the viscosity of the composition, thereby finding a number of applications for the above-mentioned purposes. Nevertheless, the composition suffers the disadvantage including harmfulness to the workers handling such an organic solvent, possibility of such hazard as fire or explosion, and public nuisance accompanying air pollution, whereby the solvent use regulation is made stringent year by year.

On the other hand, the solid-type epoxy composition is a combined product of a solid epoxy resin with a solid curing agent. The purpose of use thereof is principally a coating material but is limited with regard to its workability. On the contrary, the aqueous epoxy resin composition is obtained by dispersing or dissolving an epoxy resin and a curing agent in water and forms a composition excellent in workability free from the aforesaid drawback which is inherent in the other types of compositions except for the film properties of the cured product therefrom.

The conventional aqueous epoxy resin composition suffers the disadvantage that an emulsifier which is used for producing a stable emulsion exerts evil influence on the physical properties of the cured epoxy product. Japanese Patent Application Publication No. 40688/1986 and Japanese Patent Application Laid-Open No. 351628/1992 each disclose a curing agent imparted with surface activation performance. Even the cured product formed by the use of the above-mentioned curing agent suffers the shortcoming that such cured product is inferior to the cured product of a solvent type or a solventless type in terms of the film properties such as water resistance, chemical resistance and adhesiveness. In addition, Japanese Patent Application Laid-Open No. 179801/1994 discloses a process for producing a self-emulsifiable curing agent imparted in the molecules with surface activity including hydrophilicity and hydrophobicity which process comprises subjecting polyglycidyl ether of a hydrophilic polyalkylene polyether polyol and a hydropholic epoxy compound to adduct reaction with an polyamine. However, the self-emulsifiable curing agent which is produced by the above-mentioned process is still insufficient in its surface activation performance, and in order to assure a stable emulsification state, it is required to use a relatively large amount of the polyglycidyl ether of a hydrophilic polyalkylene polyether polyol, thereby exerting adverse influence on the film properties of the cured product to be formed.

SUMMARY OF THE INVENTION

It is an object of the present invention to provide an amine-based epoxy-resin curing agent which has favorable dispersibility in water; gives a cured product excellent in film properties such as adhesivity to various substrates and water resistance; is well suited for use in a coating material and an adhesive each using water as a medium; and can eliminate a number of such disadvantages involved in the aforesaid prior arts as harmfulness to human beings caused by the use of an organic solvent, possibility of inducing such hazard as fire or explosion, and environmental pollution.

As a result of intensive research and investigation made by the present inventors for the purpose of solving the above-mentioned problems, it has been found that a self-emulsifiable epoxy resin curing agent can be produced by subjecting an epoxy group-containing alkoxypolyethylene polyether compound as hydrophilic group and a hydrophobic epoxy compound as lipophilic group to adduct reaction with a polyamine, while the hydrophilic group is balanced with the lipophilic group; that the self-emulsifiable curing agent thus obtained can easily emulsify an epoxy resin; and that the cured product obtained thereby is superior in physical properties to conventional aqueous epoxy resin compositions. The present invention has been accomplished by the foregoing finding and information.

Specifically the present invention provides an aqueous self-emulsifiable epoxy resin curing agent which is produced by reacting, with each other, an (A) polyamine, a (B) epoxy group-containing alkoxypolyethylene polyether compound having an average molecular weight of 500 to 5000 and at least one (C) hydrophobic epoxy compound having at least one epoxy group in the molecule in molar quantities of the epoxy group in (B) and that in (C) of 0.001 to 0.1 mol and 0.2 to 0.5 mol, respectively each based on 1 mol of a hydrogen atom bonded to a nitrogen atom in (A) which is capable of reacting with an epoxy group, said compound (B) being represented by the general formula (1)

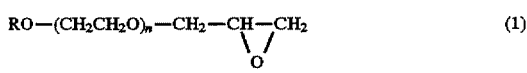

wherein R is an alkyl group having 1 to 28 carbon atoms, and n is a real number from 10 to 110. The present invention also provides an aqueous self-emulsifiable epoxy resin curing agent which is produced by reacting, with each other, an (A) polyamine, a (B) epoxy group-containing alkoxypolyethylene polyether compound having an average molecular weight of 500 to 5000, at least one (C) hydrophobic epoxy compound having at least one epoxy group in the molecule and a (D) unsaturated compound capable of addition reaction in a molar quantity of the epoxy group in (B) of 0.001 to 0.1 mol and in a molar quantity of the sum of the epoxy group in (C) and the unsaturated group in (D) of 0.2 to 0.5 mol, each based on 1 mol of a hydrogen atom bonded to an nitrogen atom in (A) which is capable of reacting with an epoxy group or a unsaturated group, said compound (B) being represented by the general formula (1)

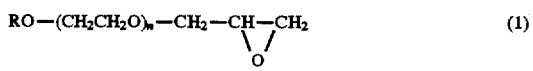   (1)

wherein R is an alkyl group having 1 to 28 carbon atoms, and n is a real number from 10 to 110, said unsaturated compound (D) being represented by the general formula (2)

$R^1 —CH=CR^2—X$   (2)

wherein $R^1$ is hydrogen atom, methyl group or ethyl group, $R^2$ is hydrogen atom or methyl group and X is CN, COOH, $COONH_2$ or $COOR^3$ wherein $R^3$ is an alkyl group having 1 to 4 carbon atoms.

DESCRIPTION OF PREFERRED EMBODIMENT

As the polyamine (A) to be used in the present invention, mention is made of an aliphatic polyamine such as ethylenediamine, diethylenetriamine, triethylenetetramine, hexamethylenediamine, meta-xylylenediamine, para-xylylenediamine and polyoxyalkylene polyamine; an alicyclic polyamine such as 1,3-bis-aminocyclohexylamine, isophoronediamine, 1,4-diaminocyclohexane and di(aminocyclohexyl)methane; an aromatic polyamine such as meta-phenylenediamine, methylenedianiline (DDM) and diaminodiphenylsulfone; a heterocyclic polyamine such as N-aminoethylpiperazine and 3,9-bis(3-aminopropyl)2,4,8,10-tetraoxaspiro(5,5)undecane.

Particularly preferable species amoung them include diethylenetriamine, triethylenetetramine, meta-xylylenediamine, 1,3-bis-aminocyclohexylamine isophoronediamine and methylenedianiline(DDM) that have heretofore been used for epoxy resin curing agent of solvent type or solventless type.

There is also usable a polyamine derived from the above-mentioned polyamine by means of a publicly known method such as amidization, Mannich reaction or epoxy-adduct reaction. Preferably usable examples of such derived polyamine include a polyamine compound produced by the reaction of xylylenediamine with epichlorohydrin and a amideamine produced by the reaction of the derived polyamine with a carboxylic acid such as a dimer acid. The above-mentioned polyamine may be used alone or as a mixture of at least two polyamines.

The average molecular weight of the epoxy group-containing alkoxypolyethylene polyether compound (B) represented by the general formula (1) to be used in the present invention

   (1)

wherein R is an alkyl group having 1 to 28 carbon atoms, and n is a real number from 10 to 110, is 500 to 5000, preferably 800 to 3000. An average molecular weight thereof less than 500 results in deteriorated emulsifiability of the curing agent to be produced, whereas that more than 5000 leads to remarkably deteriorated film properties such as deteriorated water resistance of the curing agent to be product.

In addition, the R in the alkoxy group in the general formula (1) is an alkyl group having carbon atoms of 1 to 28, preferably 1 to 18, particlarly preferably 1 to 5. The emulsifiability of the curing agent to be produced deteriorates with increasing number of carbon atoms. The emulsifiability of the curing agent can be enhanced by the combined use of at least two compounds (B) each having a molecular weight different from one another.

The ratio of the epoxy group-containing alkoxypolyethylene glycol compound (B) to the polyamine (A) in the reaction according to the present invention varies depending upon the molecular weight of the glycol compound (B) to be used, but is preferably 0.001 to 0.1 mol expressed in terms of the molar quantity of the epoxy group in the epoxy group-containing alkoxypolyethylene glycol compound based on 1 mol of the hydrogen atom bonded to a nitrogen atom in the polyamine (A) which is capable of reacting with the epoxy group. When the content of the glycol skeleton in the curing agent to be produced is unreasonably low, the emulsifiability is deteriorated, whereas when it is excessively high, the physical properties such as water resistance of the cured product is deteriorated.

The epoxy group-containing alkoxypolyethylene glycol can be produced from alkoxypolyethylene glycol and epichlorohydrin by a publicly known process, for instance, the process disclosed in Japanese Patent Application Laid-Open No. 31921/1982.

The hydrophobic epoxy compound (C) to be used in the present invention is at least one kind of hydrophobic epoxy compound (C) having at least one epoxy group in the molecule and is exemplified by a glycidyl ether of a monohydric alcohol, a glycidyl ether of a polyhydric alcohol, a glycidyl ether of a monohydric or polyhydric phenol and a glycidyl ester of a monobasic or polybasic carboxylic acid. Examples of a glycidyl ether of a monohydric alcohol include butyl glycidyl ether, 2-ethylhexyl glycidyl ether, decyl glycidyl ether, dodecyl glycidyl ether and stearyl glycidyl ether. Examples of a glycidyl ether of a monohydric phenol include phenyl glycidyl ether, tert-butylphenyl glycidyl ether and sec-butylphenyl glycidyl ether. Examples of a glycidyl ether of a polyhydric alcohol include glycerol diglycidyl ether, polypropyleneglycol diglycidyl ether, neopentylglycol diglycidyl ether and trimethylolpropane triglycidyl ether. Examples of a glycidyl ether of a polyhydric phenol include epoxy resin of so called bisphenol A which is obtained by the reaction of bisphenol A with epichlorohydrin, epoxy resin of so called bisphenol F which is obtained by the reaction of bisphenol F and epichlorohydrin and epoxy resin of so called phenol/novolac which is obtained by the reaction of phenol/formaldehyde condensate with epichlorohydrin. Examples of a glycidyl ester of a monobasic or polybasic carboxylic acid include polyglycidyl ester of terephthalic acid, hexahydrophthalic acid, maleic acid, fumaric acid, itaconic acid, succinic acid, adipic acid, sebacic acid, dimer acid, trimellitic acid, pyromellitic acid, etc. The preferable species among the above-exemplified hydrophobic epoxy compound include butyl glycidyl ether, 2-ethylhexyl glycidyl ether, tert-butylphenyl glycidyl ether, sec-butylphenyl glycidyl ether, polypropyleneglycol diglycidyl ether, epoxy resin of bisphenol A epoxy resin of bisphenol F, epoxy resin of phenol/novolac and Carjuler E (trademark of a product by Yuka Shell Epoxy Co., Ltd.) among which butyl glycidyl ether is particularly preferable. The above-exemplified species may be used alone or in combination with at least one other species.

As the unsaturated compound capable of addition reaction (D), mention is made of acrylonitrile, acrylic acid, methyl methacrylate and methacrylic amide, among which acrylonitrile is preferable.

With regard to the proportion of the polyamine, hydrophobic epoxy resin and unsaturated compound in the reaction according to the present invention, the molar quantity of the sum of the epoxy group and the unsaturated group is preferably 0.2 to 0.5 mol based on 1 mol of hydrogen atom in the polyamine bonded to a nitrogen atom which is capable of reacting with the epoxy group or the unsaturated group. The curing agent produced at a molar ratio less than the aforesaid lower limit is deteriorated in emulsification, whereas that produced at a molar ratio more than the upper limit is deteriorated in physical properties such as water resistance.

The conditions of the reaction between the polyamine and the epoxy group-containing alkoxypolyethylene polyether compound or the hydrophobic epoxy compound according to the present invention include a reaction temperature of 80° to 120° C. and a reaction time of 1 to 3 hours. The epoxy compound may be added dropwise to the reaction system simultaneously with the polyether compound or separately therefrom.

The condition of the reaction between the polyamine and the unsaturated compound according to the present invention include a reaction temperature of 80° to 120° C. and a reaction time of 1 to 3 hours. The reaction may be effected before or after the reaction of the polyamine with the epoxy compound.

Examples of the epoxy resin to be used for preparing an epoxy resin cured product by the use of aqueous self-emulsifiable epoxy resin curing agent, include epoxy resin of bisphenol A which is obtained by the reaction of bisphenol A with epichlorohydrin, epoxy resin of bisphenol F which is obtained by the reaction of bisphenol F with epichlorohydrin, epoxy resin of bisphenol AD which is obtained by the reaction of bisphenol AD with epichlorohydrin and epoxy resin of so called phenol/novalac which is obtained by the reaction of phenol/formaldehyde condensate with epichlorohydrin.

In the case of producing an aqueous epoxy resin cured product, there is usually used an emulsion-type epoxy resin by using an emulsifier or self-emulsifiable modified epoxy resin. However, in the case of using the aqueous self-emulsifiable epoxy resin curing agent according to the present invention, an epoxy resin in liquid form is usable as well.

The aqueous self-emulsifiable epoxy resin curing agent according to the present invention and the above-mentioned epoxy resin are easily emulsified by adding water, thus dispensing with such equipment as a high rotational speed homomixer. When necessary, however, an organic solvent which is generally used in coating materials may coexist with the epoxy resin. Moreover, the aqueous self-emulsifiable epoxy resin curing agent according to the present invention and the cured product from the epoxy resin may optionally be incorporated with a publicly known pigment and filler such as calcium carbonate, talc, etc., a levelling agent, antifoaming agent or the like.

In the following, the present invention will be described in more detail with referance to non-limitative examples.

PREPARATION EXAMPLE 1

In a 2 L (liter) vessel reactor equipped with an agitator, a thermometer, a tube for feeding nitrogen, a dropping funnel and a condenser were fed 1016 g of methoxypolyethylene glycol (1016 molecular weight, produced by Nippon Oil and Fats Co., Ltd. under the trademark "Uniox M-1000) and 1.5 g of $BF_3$/ether complex, and 101.8 g of epichlorohydrin was added dropwise to the mixture at 45° C. under stirring over a period of one hour. After the completion of the dropwise addition, reaction was carried out for 2 hours at a reaction temperature raised to 50° C. Then 112.4 g of 40% aqueous solution of sodium hydroxide was added dropwise to the mixture over a period of one hour. After the completion of the dropwise addition, reaction was again carried out for one hour at a reaction temperature raised to 80° C. Subsequently, water was distilled away at 80° to 100° C. under a reduced pressure of 100 mmHg. Thereafter sodium chloride which precipitated in the residue in the still was filtered off. As a result, methoxypolyethyleneglycol glycidyl ether (a) was obtained in an epoxy equivalent of 1096 g/equivalent.

PREPARATION EXAMPLE 2

In a vessel reactor same as that used in Preparation Example 1 were fed 1006 g of methoxypolyethylene glycol (2011 molecular weight, produced by Nippon Oil and Fats Co., Ltd. under the trademark "Uniox M-2000) and 0.93 g of $BF_3$/ether complex, and 50.9 g of epichlorohydrin was added dropwise to the mixture at 60° C. under stirring over a period of one hour. After the completion of the dropwise addition, reaction was carried out for 2 hours at a reaction temperature raised to 60° C. Then 56.2 g of 40% aqueous solution of sodium hydroxide was added dropwise to the mixture over a period of one hour. After the completion of the dropwise addition, reaction was again carried out for one hour at a reaction temperature raised to 80° C. Subsequently, water was distilled away at 80° to 100° C. under a reduced pressure of 100 mmHg. Thereafter sodium chloride which precipitated in the residue in the still was filtered off. As a result, methoxypolyethyleneglycol glycidyl ether (b) was obtained in an epoxy equivalent of 2979 g/equivalent.

PREPARATION EXAMPLE 3

In a one L (liter) vessel reactor equipped with an agitator, a thermometer, a tube for feeding nitrogen, a dropping funnel and a condenser were fed 272 g of m-xylylenediamine and 81.6 g or 50% aqueous solution of sodium hydroxide, and 92.5 g of epichlorohydirn was added dropwise to the mixture at 70° C. under stirring in a nitrogen atmosphere over a period of one hour. After the completion of dropwise addition, reaction was carried out for 3 hours at a reaction temperature raised as high as 110° C. Thereafter the reacttion product was cooled to 50° C. and filtered to remove sodium chloride and sodium carbonate, and the filtrate was distilled at 80° to 100° C. under a reduced pressure of 100 mmHg to distil away water. After the above distillation, the sodium chloride deposited in the bottoms of the reactor was filtered away to afford the objective polyamine compound (c) having a viscosity of 80 (Ps/25° C.), an average molecular weight of 328 and an active hydrogen equivalent of 55.

EXAMPLE 1

In a 1 L vessel reactor equipped with an agitator, a thermometer, a tube for feeding nitrogen, a dropping funnel and a condenser were fed 328 g of the polyamine compound (c) (1 mol, active hydrogen of 6.0 mol) and 116 g (0.2 mol) of dimer acid, the resultant mixture was heated to 180° C. in an atmosphere of nitrogen, and reaction was carried out for one hour, while the condensation water was distilled away.

Then reaction was carried out for one hour at a reaction temperature raised to 200° C. and further for another two hours at a reaction temperature further raised to 230° C. to complete amidization reaction. After the reactor inside temperature was lowered to 100° C., to the mixture in the reactor was added dropwise over a period of one hour, the mixture containing methoxypolyethyleneglycol glycidyl ether (b) which was synthesized in Preparation Example 2 in an amount of 76.3 g (0.026 mol, 0.0043 mol of epoxy group per one mol of active hydrogen in the polyamine compound (c)); and butylglycidyl ether in an amount of 198 g (1.6 mol, 0.267 mol of epoxy group per one mol of active hydrogen in the polyamine compound (c)). After the completion of the dropwise addition, reaction was carried out for one hour at a reaction temperature raised to 120° C. The reaction product thus obtained was cooled to 60° C. and diluted with water to a solid concentration of 94% by weight to afford a curing agent in an amount of active hydrogen equivalent of 203. The curing agent was incorporated with water to evaluate its water dilution properties. As a result, an emulsion was formed at a solid concentration of 90% by weight and further incorporated with water to dilute itself to a solid concentration of 10% by weight. It was confirmed from the result that the emulsion was stable at room temperature without causing any phase separation even at a solid concentration as low as 10% by weight.

EXAMPLE 2

In a vessel reactor same as that used in Example 1 was fed 328 g of the polyamine compound (c) (1 mol, active hydrogen of 6.0 mol). To the polyamine in the reactor was added dropwise, at 80° C. in an atmosphere of nitrogen under stirring over a period of one hour, the mixture containing methoxypolyethyleneglycol glycidyl ether (a) which was synthesized in Preparation Example 1 in an amount of 60.3 g (0.055 mol, 0.0092 mol of epoxy group per one mol of active hydrogen in the polyamine compound (c)); epoxy resin in liquid form of bisphenol A type (epoxy equivalent of 190, produced by Yuka Shell Epoxy Co., Ltd. under the trademark "Epicoat 828") in an amount of 76 g (0.2 mol, 0.067 mol of epoxy group per one mol of active hydrogen in the polyamine compound (c)); and butyl glycidyl ether in an amount of 203.9 g (1.54 mol, 0.257 mol of epoxy group per one mol of active hydrogen in the polyamine compound (c)). After the completion of the dropwise addition, reaction was carried out for one hour at a reaction temperature raised to 120° C. The reaction product thus obtained was cooled to 60° C. and diluted with water to a solid concentration of 92% by weight to afford a curing agent in an amount of active hydrogen equivalent of 181. The curing agent was incorporated with water to evaluate its water dilution properties. As a result, an emulsion was formed at a solid concentration of 90% by weight and further incorporated with water to dilute itself to a solid concentration of 10% by weight. It was confirmed from the result that the emulsion was stable at room temperature without causing any phase separation even at a solid concentration as low as 10% by weight.

EXAMPLE 3

In a vessel reactor same as that used in Example 1 was fed 328 g of the polyamine compound (c) (1 mol, active hydrogen of 6.0 mol). To the polyamine in the reactor was added dropwise, at 80° C. in an atmosphere of nitrogen under stirring over a period of one hour, the mixture containing methoxypolyethyleneglycol glycidyl ether (a) which was synthesized in Preparation Example 1 in an amount of 109.6 g (0.1 mol, 0.0167 mol of epoxy group per one mol of active hydrogen in the polyamine compound (c)); epoxy resin in liquid form of bisphenol A type (epoxy equivalent of 190, produced by Yuka Shell Epoxy Co., Ltd. under the trademark "Epicoat 828") in an amount of 76 g (0.2 mol, 0.067 mol of epoxy group per one mol of active hydrogen in the polyamine compound (c)); and butyl glycidyl ether in an amount of 132.0 g (1.0 mol, 0.167 mol of epoxy group per one mol of active hydrogen in the polyamine compound (c)). After the completion of the dropwise addition, reaction was carried out for one hour at a reaction temperature raised to 120° C., followed by temperature lowering to 80° C.

To the reaction product was further dropwise added acrylonitrile in an amount of 21.2 g (0.4 mol, 0.067 mol of unsaturated group per one mol of active hydrogen in the polyamine compound (c)) at 80° C. over period of one hour. After the completion of the dropwise addition, reaction was carried out for one hour at a reaction temperature raised to 20° C. The reaction product thus obtained was cooled to 60° C. and diluted with water to a solid concentration of 92% by weight to afford a curing agent in an amount of active hydrogen equivalent of 177. The curing agent was incorporated with water to evaluate its water dilution properties. as a result, an emulsion was formed at a solid concentration of 90% by weight and further incorporated with water to dilute itself to a solid concentration of 10% by weight. It was confirmed from the result that the emulsion was stable at room temperature without causing any phase separation even at a solid concentration as low as 10% by weight.

EXAMPLE 4

In a vessel reactor same as that used in Example 1 was fed 136.1 g of meta-xylylenediamine (1 mol, active hydrogen of 4.0 mol). To the content in the reactor was added dropwise at 80° C., in an atmosphere of nitrogen under stirring over a period of one hour, the mixture containing methoxypolyethyleneglycol glycidyl ether (a) which was synthesized in Preparation Example 1 in an amount of 46.2 g (0.042 mol, 0.01 mol of epoxy group per one mol of active hydrogen in the meta-xylylenediamine); epoxy resin in liquid form of bisphenol A (epoxy equivalent of 190, produced by Yuka Shell Epoxy Co., Ltd. under the trademark "Epicoat 828") in an amount of 95 g (0.25 mol, 0.125 mol of epoxy group per one mol of active hydrogen in the meta-xylylenediamine); and butyl glycidyl ether in an amount of 184.8 g (1.40 mol, 0.35 mol of epoxy group per one mol of active hydrogen in the meta-xylylenediamine). After the completion of the dropwise addition, reaction was carried out for one hour at a reaction temperature raised to 120° C. The reaction product thus obtained was diluted with water to a solid concentration of 94% by weight to afford a curing agent in an amount of active hydrogen equivalent of 239. The curing agent was incorporated with water to evaluate its water dilution properties. As a result, an emulsion was formed at a solid concentration of 90% by weight and further incorporated with water to dilute itself to a solid concentration of 10% by weight. It was confirmed from the result that the emulsion was stable at room temperature without causing any phase separation even at a solid concentration as low as 10% by weight.

COMPARATIVE EXAMPLE 1

The procedure in Example 2 was repeated to prepare a curing agent except that the charge of the methoxypolyethyleneglycol glycidyl ether (a) was reduced to 6.1 g (0.0056 mol, 0.00093 mol of epoxy group per one mol of active hydrogen in the polyamine compound (c)). The curing agent obtained in an amount of active hydrogen equivalent of 165 was incorporated with water to evaluate its water dilution properties. As a result, an emulsion was formed at a solid concentration of 90% by weight and further incorporated with water. The result revealed that phase separation took place at a solid concentration of 55% by weight.

COMPARATIVE EXAMPLE 2

In a 1 L vessel reactor same as that used in Example 1 was fed 136.1 g of meta-xylylenediamine (1.0 mol, active hydrogen of 4.0 mol). To the content in the reactor was added dropwise, at 80° C. in an atmosphere of nitrogen under stirring over a period of one hour, the mixture containing methoxypolyethyleneglycol glycidyl ether (a) which was synthesized in Preparation Example 1 in an amount of 46.2 g (0.042 mol, 0.01 mol of epoxy group per one mol of active hydrogen in the meta-xylylenediamine); epoxy resin in liquid form of bisphenol A (epoxy equivalent of 190, produced by Yuka Shell Epoxy Co., Ltd. under the trademark "Epicoat 828") in an amount of 95 g (0.25 mol, 0.125 mol of epoxy group per one mol of active hydrogen in the meta-xylylenediamine); and butyl glycidyl ether in an amount of 184.8 g (1.40 mol, 0.35 mol of epoxy group per one mol of active hydrogen in the meta-xylylenediamine). After the completion of the dropwise addition, reaction was carried out for one hour at a reaction temperature raised to 120° C., followed by temperature lowering to 80° C.

To the reaction product was further dropwise added acrylonitrile in an amount of 53.0 g (1.0 mol, 0.25 mol of epoxy group per one mol of active hydrogen in the meta-xylylenediamine) at 80° C. over period of one hour. After the completion of the dropwise addition, reaction was carried out for one hour at a reaction temperature raised to 120° C. The reaction product thus obtained was cooled to 60° C. and diluted with water to a solid concentration of 94% by weight to afford a curing agent in an amount of active hydrogen equivalent of 518. The curing agent was incorporated with water to evaluate its water dilution properties. As a result, an emulsion was formed at a solid concentration of 90% by weight and further incorporated with water to dilute itself to a solid concentration of 10% by weight. It was confirmed from the result that the emulsion was stable at room temperature without causing any phase separation even at a solid concentration as low as 10% by weight.

PRACTICAL EXAMPLE 1

The curing agent in an amount of 81.4 g which had been obtained in Example 1 was incorporated under mixing into 100 g of a modified epoxy resin (epoxy equivalent of 250, solid content of 100%, produced by Asahi Denka Kogyo K.K. under the trademark "Adekarange EPES-0425"), and 70.8 g of additional water was added to the mixture with stirring to prepare an aqueous epoxy resin composition in the form of emulsion. The resultant composition was applied onto a cold rolled steel sheet (70×15×0.8 mm) which had been treated with a #240 sand paper by the use of a 200 μm doctor blade and cured under the conditions of 23° C. and 50% RH for 7 days to prepare a coat on the steel sheet. Table 1 collectively gives the blending ratio of the epoxy resin composition used and the evaluation result of the coat thus obtained.

PRACTICAL EXAMPLE 2

The curing agent in an amount of 97.4 g which had been obtained in Example 2 was incorporated under mixing into 100 g of epoxy resin in liquid form of bisphenol A type (epoxy equivalent of 190, produced by Yuka Shell Epoxy Co., Ltd. under the trademark "Epicoat 828"), and additional water was added to the mixture with stirring so as to attain a solid concentration of 70% by weight to prepare an aqueous epoxy resin composition in the form of emulsion. By the use of the composition thus obtained, a coat was prepared on the steel sheet in the same manner as in Practical Example 1. Table 1 collectively gives the blending ratio of the epoxy resin composition used and the evaluation result of the coat thus obtained.

PRACTICAL EXAMPLE 3

The procedure in Practical Example 2 was repeated to prepare a coat on the steel sheet except that 93.2 g of curing agent as obtained in Exmple 3 was used in place of 97.4 g of the curing agent as obtained in Example 2. Table 1 collectively gives the blending ratio of the epoxy resin composition used and the evaluation result of the coat thus obtained.

PRACTICAL EXAMPLE 4

The procedure in Practical Example 2 was repeated to prepare a coat on the steel sheet except that 127.8 g of curing agent as obtained in Example 4 was used in place of 97.4 g of the curing agent as obtained in Example 2. table 1 collectively gives the blending ratio of the epoxy resin composition used and the evaluation result of the coat thus obtained.

PRACTICAL EXAMPLE 5

The procedure in Practical Example 2 was repeated to prepare a coat on the steel sheet except that 272.6 g of curing agent as obtained in Comparative Example 2 was used in place of 97.4 g of the curing agent as obtained in Example 2. Table 1 collectively gives the blending ratio of the epoxy resin compositinn used and the evaluation result of the coat thus obtained.

TABLE 1

| Practical Example | 1 | 2 | 3 | 4 | 5 |
| --- | --- | --- | --- | --- | --- |
| Blending ratio (part/s by weight) | | | | | |
| Epicoat 828 | — | 100 | 100 | 100 | 100 |
| Adekarange EPES-0425 | 100 | — | — | — | — |
| Curing agent in Example 1 | 81.4 | — | — | — | — |
| Curing agent in Example 2 | — | 97.4 | — | — | — |
| Curing agent in Example 3 | — | — | 93.2 | — | — |
| Curing agent in Example 4 | — | — | — | 127.8 | — |
| Curing agent in Comparative Example 2 | — | — | — | — | 272.6 |
| Additional water | 70.8 | 73.5 | 82.8 | 86.7 | 159.7 |
| Solid concentration (% by weight) | 70 | 70 | 70 | 70 | 70 |
| Emulsifiability of curing agent | ⊚ | ⊚ | ⊚ | ⊚ | ⊚ |
| Evaluating results of coat | | | | | |
| External appearance of coat | ⊚ | ⊚ | ⊚ | ○ | X |
| Pencil hardness | | | | | |
| after a day from coating | B | 2H | B | H | <6B |
| after 7 days from coating | HB | 3H | HB | H | <6B |
| Adhesivity to carbon steel sheet | | | | | |
| Erichsen test (mm) | 9< | 8.7 | 9< | 9< | 9< |
| Cross-cut test | 100/100 | 0/100 | 100/100 | 100/100 | 100/100 |
| Water resistance | ⊚ | ⊚ | ⊚ | ⊚ | X |

In the present practical examples, the following method and symbols were used to evaluate the cured coat and represent the evaluation results.

(1) Emulsifiability of Curing Agent

In a 200 mL (milliliter) plastic container was weighed 10 g of a curing agent, while water was gradually placed in the container under stirring with a wooden spatula to dilute to a solid concentration of 10% by weight. The resultant solid/water mixture was allowed to stand at 23° C. and visually judged for the emulsifying state at intervals of a prescribed period of time. The result was evaluated with the following four ratings.

⊚: Stable emulsion even after one week

○: Phase separation within one week

Δ: Phase separation within 24 hours x: Immediate phase separation (2) External Appearance of Coat (After 7 Days of Curing)

The evaluation result of external appearance of cured coat was expressed with the following symbols ⊚: Excellent  ○: Good  Δ: Fair  x: Poor (3) Pencil Hardness and Adhesivity to Carbon Steel Sheet including Erichsen test and cross-cut test: carried out in accordance with JIS K5400.

(4) Water Resistance (After 7 Days of Immersion in Water)

The evaluation result of water resistance was expressed with the following symbols.

---

⊚: No change at all  ○: Almost maintaining the initial external appearance
Δ: Slight change  X: Change

---

COMPARATIVE EXAMPLE 3

The procedure in Example 4 was repeated to prepare a curing agent except that 49.3 g of polyethyleneglycol glycidyl ether (epoxy equivalent of 587, produced by Nagase Chemical Industries, Co., Ltd. under the trademark "Deconal EX-861") was used in place of 46.2 g of methoxypolyethyleneglycol glycidyl ether (a) as obtained in Example 4. The evaluation result for the emulsifiability of the caring agent thus obtained was marked as X (immediate phase separation).

COMPARATIVE EXAMPLE 4

To 20 g of meta-xylylenediamine placed in a vessel reactor same as that used in Example 1 were gradually added 13 g of a hydrophilic epoxy compound consisting of Denacol EX 861 (molecular weight of 1170, ethylene oxide content of 88.9% by weight, epoxy equivalent of 587), 7 g of a hydrophobic epoxy compound consisting of Epicoat 828 (produced by Yuka Shell Epoxy Co., Ltd.) and 7 g of Epicoat 807 (produced by Yuka Shell Epoxy Co., Ltd.), while the temperature was maintained at 40° to 50° C. with sufficient care of heat generation under sufficient stirring. The compounds thus added were allowed to reacted with each other at 90° C. for 2 hours with the result that a self-emulsifiable active organoamine-based curing agent was obtained. The evaluation result for the emulsifiability of the curing agent thus obtained was mark as X (immediate phase separation).

As can be seen from the above-mentioned examples and practical examples, the aqueous self-emulsifiable epoxy resin curing agent according to the present invention easily emulsifies an epoxy resin and affords an epoxy resin cured product excellent in physical properties such as water resistance and adhesivity.

What is claimed is:

1. An aqueous self-emulsifiable epoxy resin curing agent which is produced by reacting, with each other, an (A) polyamine, a (B) epoxy group-containing alkoxypolyethylene polyether compound having an average molecular weight of 500 to 5000 and at least one (C) hydrophobic epoxy compound having at least one epoxy group in the molecule in molar quantities of the epoxy group in (B) and that in (C) of 0.001 to 0.1 mol and 0.2 to 0.5 mol, respectively each based on 1 mol of a hydrogen atom bonded to a nitrogen atom in (A) which is capable of reacting with an epoxy group, said compound (B) being represented by the general formula (1)

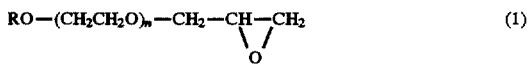 (1)

wherein R is an alkyl group having 1 to 28 carbon atoms, and n is a real number from 10 to 110.

2. The aqueous self-emulsifiable epoxy resin curing agent according to claim 1 wherein said polyamine (A) is at least one member selected from the group consisting of diethylenetriamine, triethylenetetramine, meta-xylylenediamine, 1,3-bis-aminocyclohexylamine, isophoronediamine, methylenedianiline, an amidization reaction product of said polyamine, a Mannich reaction product of said polyamine and an epoxy adduct reaction product of said polyamine.

3. The aqueous self-emulsifiable epoxy resin curing agent according to claim 1 wherein said epoxy group-containing alkoxypolyethylene polyether (B) has an average molecular weight in the range of 800 to 3000.

4. The aqueous self-emulsifiable epoxy resin curing agent according to claim 1 wherein said R in the general formula (1) has 1 to 18 carbon atoms.

5. The aqueous self-emulsifiable epoxy resin curing agent according to claim 1 wherein said hydrophobic epoxy compound (C) is at least one member selected from the group consisting of a glycidyl ether of a mono-or-poly-hydric alcohol, a glycidyl ether of a mono-or-poly-hydric phenol and a glycidyl ether of a mono-or-poly-basic carboxylic acid.

6. The aqueous self-emulsifiable epoxy resin curing agent according to claim 5 wherein said hydrophobic epoxy compound (C) is at least one member selected from the group consisting of butyl glycidyl ether, 2-ethylhexyl glycidyl ether, tert-butylphenyl glycidyl ether, sec-butylphenyl glycidyl ether, polypropyleneglycol diglycidyl ether, an epoxy resin of bisphenol A, an epoxy resin of bisphenol F and an epoxy resin of phenol/novolac.

* * * * *